US006933465B2

(12) United States Patent
Bankstahl et al.

(10) Patent No.: US 6,933,465 B2
(45) Date of Patent: *Aug. 23, 2005

(54) SCREW AIR COMPRESSOR FOR A WELDER (75) Inventors: Herbert A. Bankstahl, Appleton, WI (US); Joseph Gitter, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/605,738

(22) Filed: Oct. 22, 2003

(65) Prior Publication Data

US 2004/0104209 A1 Jun. 3, 2004

Related U.S. Application Data (63) Continuation of application No. 09/683,749, filed on Feb. 11, 2002, now Pat. No. 6,674,046.

(51) Int. Cl.$^7$ .............................. B23K 9/10; H05B 7/11
(52) U.S. Cl. ....................................... 219/133; 290/1 A
(58) Field of Search ............................... 219/133, 134; 290/1 R, 1 A, 40 R (56) References Cited

U.S. PATENT DOCUMENTS

| 4,173,951 | A | 11/1979 | Ishihara ........................ 123/2 |
| 4,293,281 | A | 10/1981 | Lamoreaux ..................... 417/9 |
| 4,465,920 | A | 8/1984 | Hoyt, Jr. et al. ............. 219/133 |
| 4,698,975 | A | 10/1987 | Tsukamoto et al. ............ 60/721 |
| 5,341,644 | A | 8/1994 | Nelson ......................... 60/627 |
| 5,386,873 | A | 2/1995 | Harden et al. ................. 165/47 |
| 5,795,136 | A | 8/1998 | Olsaker et al. ............. 417/295 |
| 6,051,809 | A | 4/2000 | Colella ........................ 219/133 |
| 6,065,942 | A | 5/2000 | Glidden et al. ............. 417/236 |
| 6,362,533 | B1 | 3/2002 | Morohoshi et al. ......... 290/1 A |
| 6,435,925 | B1 | 8/2002 | Mabru ......................... 440/113 |
| 6,674,046 | B2 * | 1/2004 | Bankstahl et al. ........... 219/133 |
| 2002/0122727 | A1 | 9/2002 | Gaither ......................... 417/16 |

OTHER PUBLICATIONS http://www.dynamicpowersource.com.
http://www.dynamicpowerbox.com.
http://www.millerwelds.
http://www.lincoln.electric.com.

* cited by examiner

Primary Examiner—Kevin P. Kerns
(74) Attorney, Agent, or Firm—Ziolkowski Patent Solutions Group, SC (57) ABSTRACT

A portable and fully integrated welder and compressor combination includes a housing having an engine, electrical current generating alternator, and a belt-driven screw air compressor. The engine is configured to drive the generator directly, and a pulley arrangement is provided on the engine to drive the belt-driven screw air compressor.

35 Claims, 8 Drawing Sheets

SCREW AIR COMPRESSOR FOR A WELDER

CROSS REFERENCE TO RELATED APPLICATIONS

The present application is a continuation and claims priority of U.S. Ser. No. 09/683,749 filed Feb. 11, 2002, now issued as U.S. Pat. No. 6,674,046 entitled "Screw Air Compressor for a Welder".

BACKGROUND OF INVENTION

The present invention relates generally to combined welder and compressor units, and more particularly to a unit of this type having a belt-driven screw air compressor configured to provide compressed air for pneumatic operations.

Portable welding and compressor units transportable to a work site are known. Typical known units include a lightweight frame consisting of metal tubing on which is mounted an internal combustion engine that is directly connected to a generator which generates an amperage to operate the unit or welder. The generator further provides auxiliary alternating current for operating auxiliary equipment, such as an air compressor. The air compressor provides compressed air for pneumatic equipment as well as certain welding applications, such as operating a plasma cutting torch. Other known portable welding and compressor units include an engine, alternator, compressor, and air tank assembly mounted within a housing along an extended length of the housing.

While combined welder and compressor units operate satisfactorily, they have several disadvantages. First, such systems tend to be bulky and/or heavy. In a typical unit, a welder may weigh approximately 2000 pounds and have a separate compressor unit adding approximately 1500 pounds. Transporting such systems to various work sites is difficult and time consuming. Second, known welder and compressor units incorporate air compressors that have high rates of mechanical breakdowns. Moreover, air compressors are often positioned within the welding unit, and in instances of air compressor breakdown, associated repair costs and welding unit downtime may be substantial.

There is a need for a welder and compressor unit or combination that has improved portability and durability. It would therefore be desirable to have a more lightweight and efficient air compressor than current air compressors, that can be externally mounted to an internal combustion engine for rapid repair and replacement.

BRIEF DESCRIPTION OF INVENTION

The present invention is directed to an improved welder and compressor combination to supply compressed air and electrical current for pneumatic and arc welding operations to overcome the aforementioned concerns.

The invention includes a portable welder having an internal screw air compressor. Screw air compressors are generally more durable than reciprocating air compressors used with known devices and have additional desired characteristics that include low initial cost, compact size, and low weight. Further, a screw air compressor, especially one belt driven by an engine as in the present invention, is easy to repair and maintain which is desirable in portable equipment. In addition to a screw air compressor, the present invention also includes an engine mounted within a housing of the welder which provides power to an electric current generator for generating the electrical current used during welding operations. The engine has a pulley arrangement connected by belts that drive the screw air compressor, an alternator, and an engine cooling fan. Further included is a clutch assembly connected to the screw air compressor that controls the screw air compressor which provides compressed air for pneumatic operations.

In accordance with one aspect of the present invention, a welder and compressor combination includes a transportable housing having an engine mounted therein. An electrical generator is also mounted within the housing and driven by the engine, and provides an arc welding current for use in welding operations. The welding and compressor combination further includes a screw air compressor that provides compressed air as needed. The screw air compressor is preferably mounted to the engine to permit rapid installation during manufacture and removal for replacement or repair of the screw air compressor as may be needed. The screw air compressor also includes a clutch assembly driven by a belt in operable association with the engine. The clutch assembly engages or disengages the screw air compressor from the engine.

In accordance with another aspect of the present invention, an engine-driven welder combination is disclosed and includes a welder housing having internal components mounted thereto. An engine is also mounted within the welder housing, and has an electrical generator and screw air compressor connected thereto. The engine rotates the electrical generator to produce an arc welding current for welding operations. The screw air compressor provides compressed air for air-driven tools. The screw air compressor has a disengageable drive pulley connected to the engine and is mounted on the engine. The screw air compressor is externally mounted to the engine in such a fashion to allow easy installation and provide quick removal for servicing.

In accordance with yet another aspect of the present invention, a welding and air compression system includes a means for compressing air having at least one screw-type means rotatable in a longitudinal cylinder to generate compressed air, and a means for generating an arc welding current. A means for driving the air compressing means is provided along with a means for generating an arc welding current. Examples of such means include an internal combustion engine configured to drive an electric generator and a screw air compressor. The welding and air compression system further includes a means for connecting air to the means for driving, and a means for regulating the means for compressing air.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
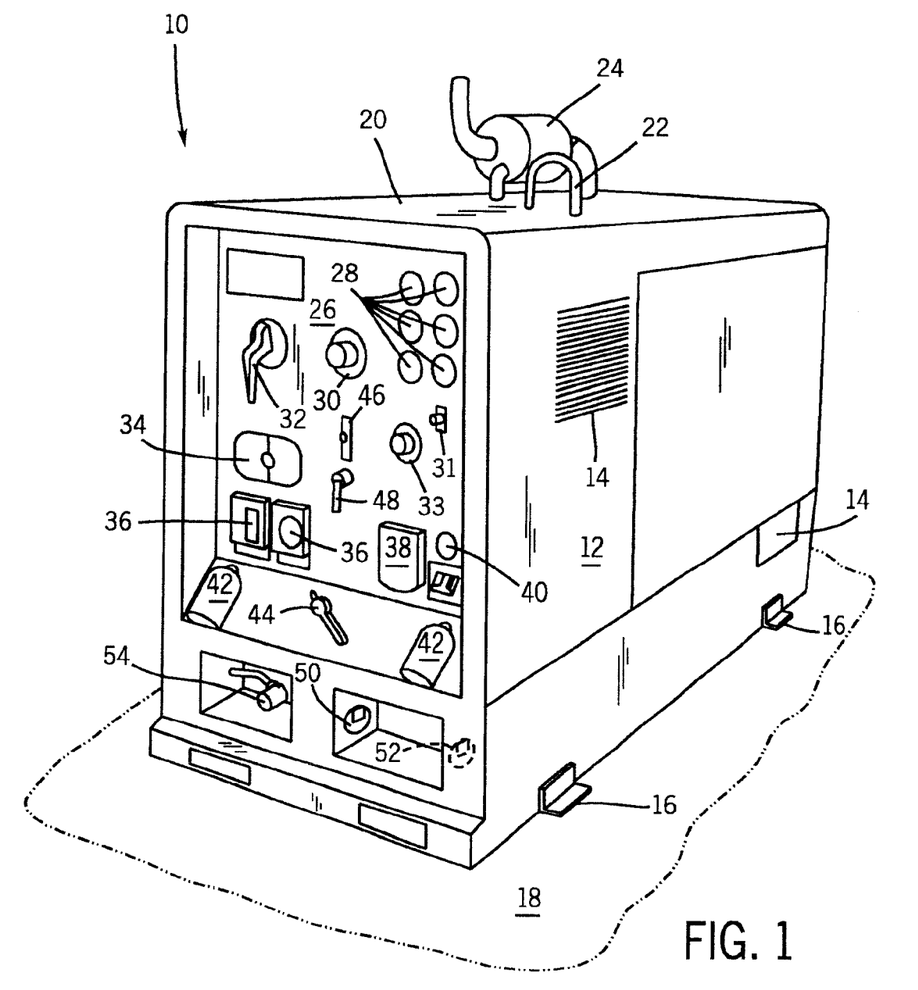
FIG. 1 is a perspective view of a welder and compressor combination incorporating the present invention.

Referring now to FIG. 1, a portable engine-driven welding and compressor combination or system 10 is provided. The welder combination 10 has an outer housing 12 that has one or more air vents 14 for cooling internal components of the welder combination 10. The housing 12 can be easily removed to permit access to the internal components for maintenance and service. A plurality of support members 16 provide stabilization for the welder combination 10 when placed on a generally level surface, such as surface 18. An upper surface 20 of the welder combination 10 includes a lifting hook 22 extending therethrough for lifting and transporting of the welder combination 10. Also attached to the upper surface 20 is an exhaust system 24 that lowers noise and removes exhaust gas from the welder combination 10.

The welder combination 10 includes a control panel 26 that has various control elements and gauges for operating the welder combination 10. A plurality of gauges 28 measure various parameters of the welder combination 10. Measured parameters can include oil pressure, fuel level, oil temperature, battery amperage, air pressure, and engine running time of the welder combination 10. Control panel 26 also has a control dial 30 and an ampere range switch 32 which are used to select a voltage/amperage for welding operations. Process selector switch 34 selects the type of weld output. The weld output is determined by the type of welding process. Examples of weld processes that may be implemented include stick welding, TIG welding, air-carbon arc cutting, and various wire feed processes. Electrical outlets 36 provide power for electrically driven devices, such as saws, drills, etc. Control panel 26 also includes a compressor on/off switch 31 and an engine control switch 33 to independently control the compressor and engine, respectively.

The control panel 26 also includes multiple power connections such as single phase power connect 38, optional three-phase power connect 40, and weld-power receptacles 42. An optional polarity switch 44 can be used to select the polarity of the weld output. Typical selections include direct current electrode negative, direct current electrode positive, and alternating current. A panel remote switch 46 and remote receptacle 48 select remote control of the welder combination 10 in instances where welding operations are remotely located from the welder combination 10. Positive 50 and negative 52 battery charge connections are used for battery jumpstart or charging, and are positioned adjacent to a system output or shut-off valve 54. Upon engaging of the compressor clutch and opening of valve 54, compressed air is supplied for air assisted carbon arc cutting or to air driven power tools and other pneumatic operations.

Figure 2:
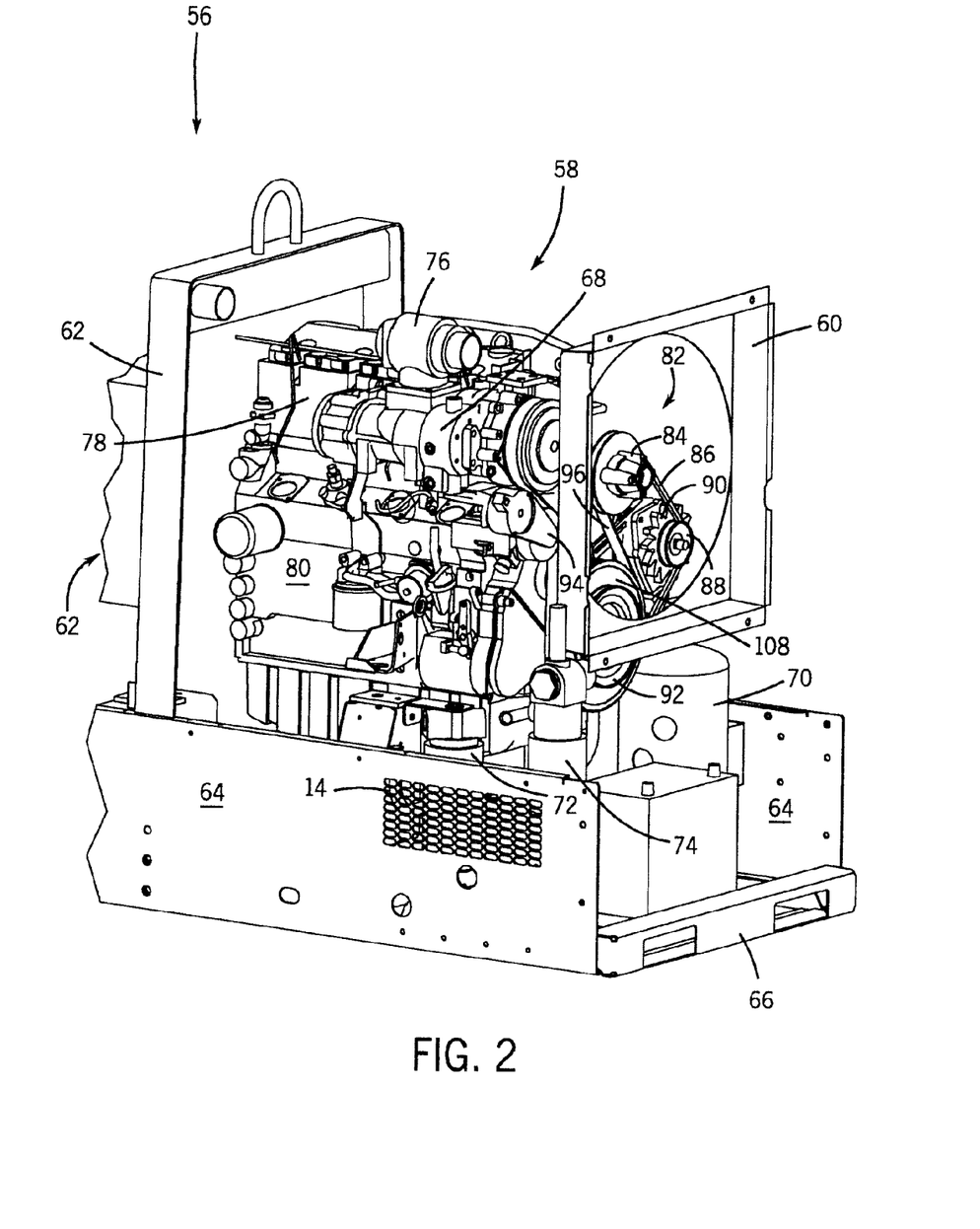
FIG. 2 is a perspective view of a portion of the welder and compressor combination with a housing cover removed.

Referring now to FIG. 2, a perspective view of a portion 56 of the welder combination 10 of FIG. 1 is shown with the housing cover 12 removed. An internal combustion engine 58 is mounted to a frame assembly 64 between a radiator shroud 60 and a lifting hook support member 62. The engine 58, in a preferred embodiment, is oil cooled and configured to recirculate engine cooling oil. The lifting hook support member 62 secures to the frame assembly 64 for structural support during lifting of the welder combination 10. The frame assembly 64 has air vents 14 that permit air flow through the welder combination 10 to cool the internal components. Cross-brace 66 provides structural support for the frame assembly 64. An electrical generator 67 configured to generate an arc welding current is mounted within the housing 12 of the welder combination 10 and driven by the engine 58. The welder combination further includes a screw air compressor 68 mounted to the engine 58 that is configured to provide compressed air to the shut-off valve 54 of FIG. 1. The screw air compressor 68 is fluidly connected to an oil separator 70, a coalescing filter 72, which combine to separate oil from an air/oil mixture and a first particle oil filter.

The internal combustion engine 58 of the welder combination 10 includes an air intake connected to an intake manifold and engine head 78. The engine head 78 is mounted to an engine block 80, which collectively form the engine 58. A pulley arrangement 82 is bolted to both the engine head 78 and the engine block 80 and includes a fan blade hub 84 rotated by a first drive belt 86, such as a serpentine belt. The first drive belt 86 further connects to an alternator pulley 88 that drives an alternator 90 by a first crankshaft pulley 92. A bolt tensioner 94 connects to a mounting bracket 120 to maintain tension on a second drive belt 96 that drives the screw air compressor 68 driven by a second crankshaft pulley 108.

Figure 2A:
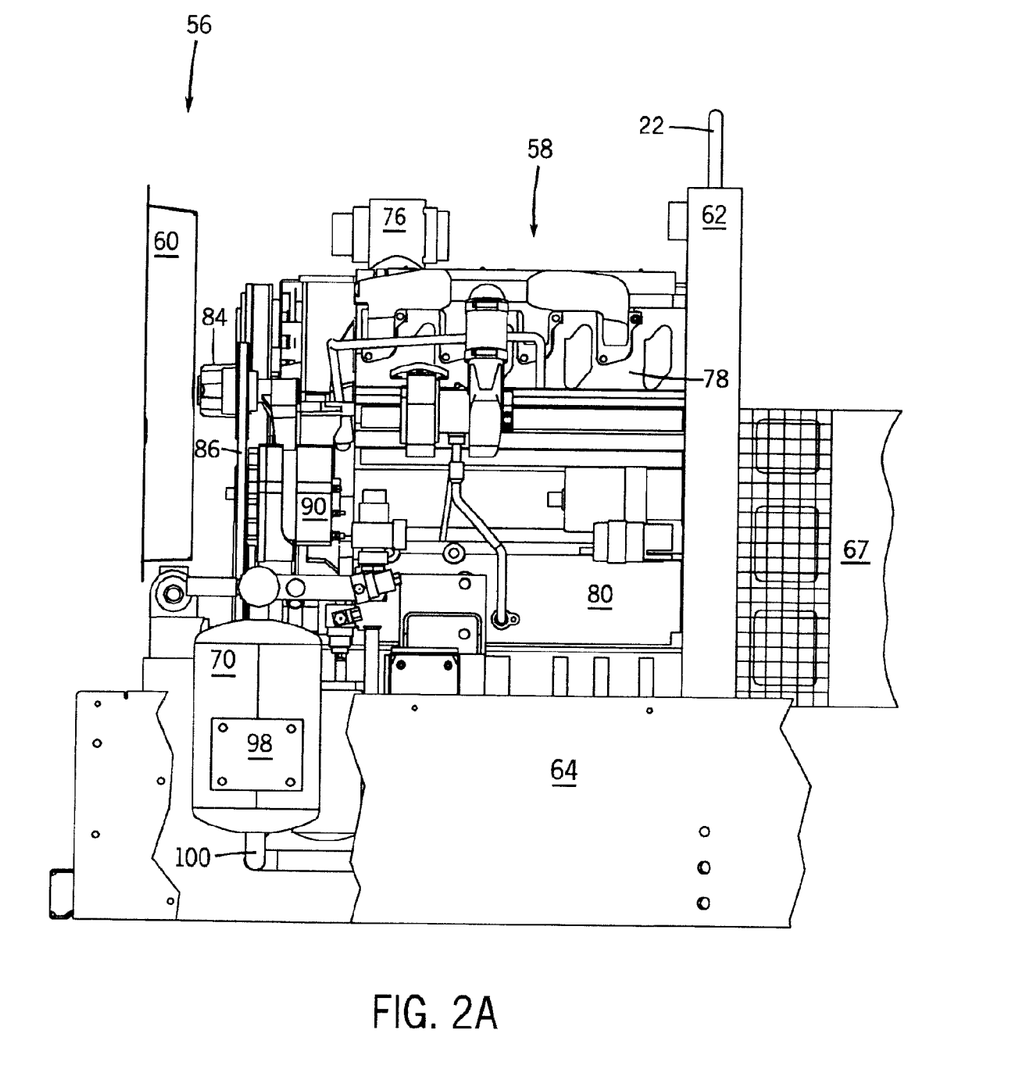
FIG. 2A is a side view of the welder and compressor combination of FIG. 2.

Referring now to FIG. 2A, a side view of the portion 56 of FIG. 2 is shown. Frame assembly 64 connects to support member 62 which is attached to lifting hook 22. The internal combustion engine 58 is shown having fan blade hub 84 attached to the engine head 78 as previously discussed with reference to FIG. 2. A fan (not shown) is attached to fan blade hub 84 that is housed in the radiator shroud 60. Engine block 80 has alternator 90 mounted thereto which is driven by the first drive belt 86. The electrical generator 67 mounts to the engine block 80 and is rotated by the engine 58 to generate the arc welding current used in welding operations. Oil separator 70 is mounted to the frame assembly 64 with a mounting plate 98. An oil return line 100 of the oil separator 70 connects the oil separator 70 to the radiator, as will be described with reference to FIG. 7. An air intake 76 is provided to supply air to the screw air compressor 68.

Figure 3:
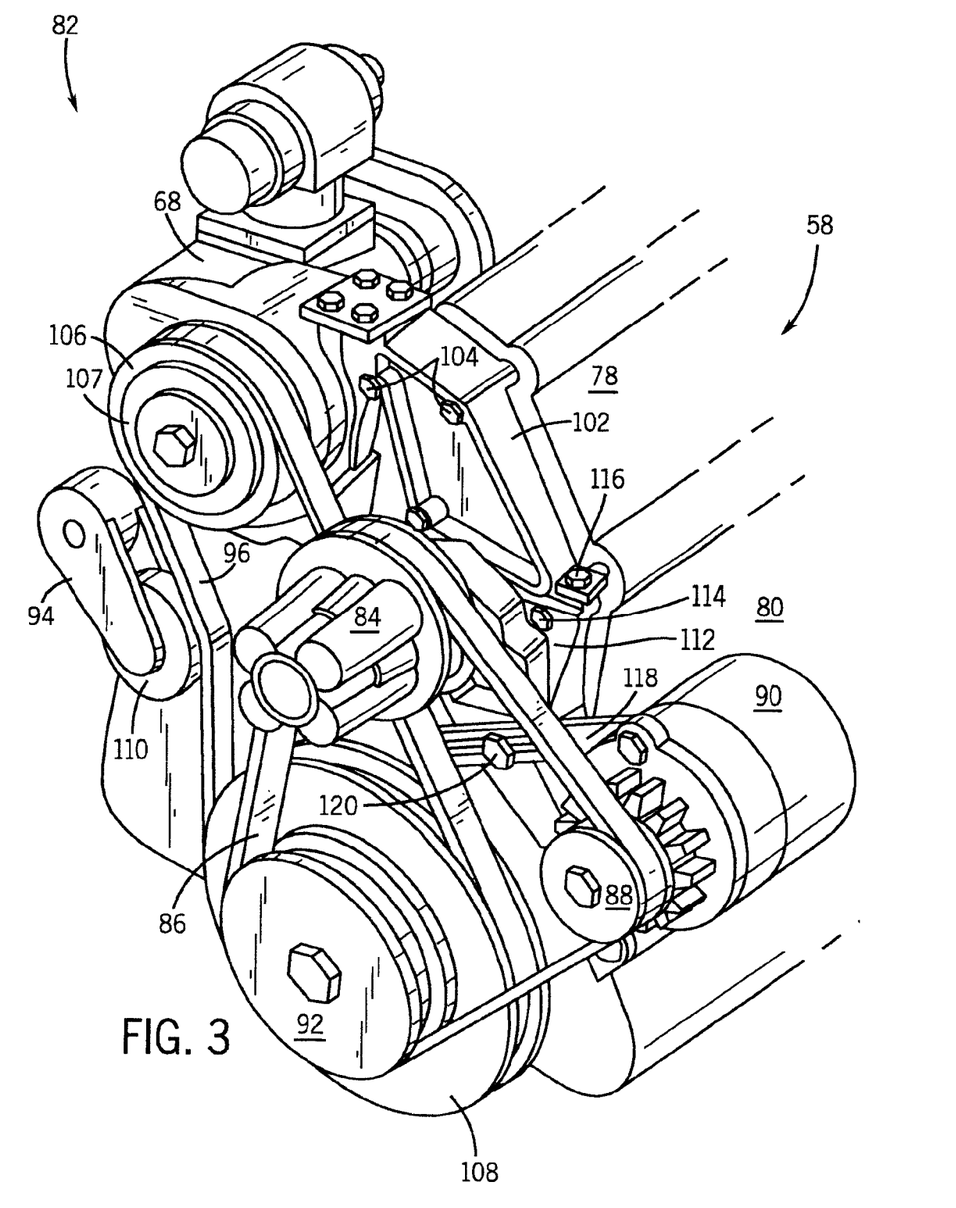
FIG. 3 is a perspective view of a portion of an engine showing a pulley arrangement of the welding and compressor combination of FIG. 2.

FIG. 3 is a perspective view of the pulley arrangement 82 connected to the engine head 78 and the engine block 80. The screw air compressor 68 bolts to a first mounting bracket 102 that is connected to the engine head 78 via bolts 104. The screw air compressor pulley 106 of the pulley arrangement 82 is driven by the second drive belt 96 which in turn is driven by the second crankshaft pulley 108. The screw air compressor 68 is controlled by a clutch assembly 107 which is connected to air compressor pulley 106. Preferably, the clutch assembly 107 is a magnetic clutch assembly. Tension on the second drive belt 96 is maintained by a roller 110 of the belt tensioner 94.

A second mounting bracket 112 is mounted to the engine block 80 via a set of bolts 114, and is connected to the first mounting bracket 102 via bolts 116 to attach the pulley arrangement 82 to the engine 58. The fan blade hub 84 is secured to the second mounting bracket 112, and is driven by the first drive belt 86. The first drive belt 86 also drives alternator pulley 88 and is driven by first crankshaft pulley 92 of the pulley arrangement 82. Also included is an adjustable slide linkage 118 that has bolt 120 which connects to the second mounting bracket 112 to position the alternator 90 and provide tension to first drive belt 86. That is, the alternator 90 can be repositioned according to the position of bolt 120 along the adjustable slide linkage 118 to provide more or less tension on the first drive belt 86.

Figure 4:
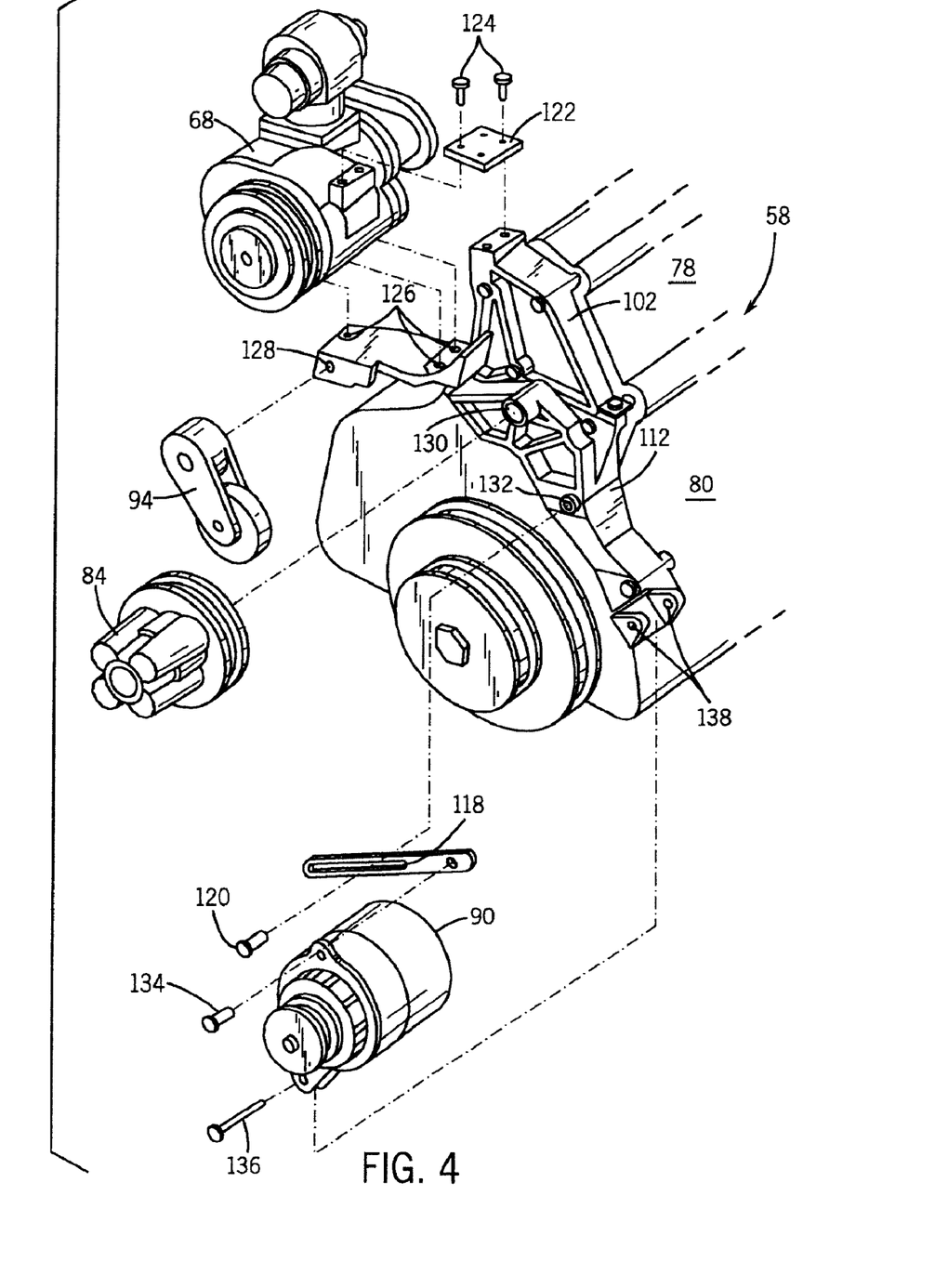
FIG. 4 is an exploded view of FIG. 3 without the belts for driving the pulley arrangement.

Referring now to FIG. 4, an exploded view of FIG. 3 showing the connections of the components to one another without the first and second drive belts 86, 96 is shown. The pulley arrangement 82 includes a mounting plate 122 for connecting the screw air compressor 68 to the first mounting bracket 102 via bolts 124. Bolt holes 126 are used to attach the screw air compressor 68 to the first mounting bracket 102. Belt tensioner 94 is connected to the first mounting bracket 102 at bolt hole 128 with an appropriate fastener. The fan blade hub 84 is rotatably secured to the second mounting bracket 112 with a bolt through bolt hole 130. Bolt hole 132 permits connection of the adjustable slide linkage 118 to the second mounting bracket 112. Bolt 134 connects the slide linkage to the alternator 90. The alternator 90 is also connected to the second mounting bracket 112 by bolt 136 which passes through a pair of bolt holes 138. The first and second mounting brackets 102, 112 are preferably attached to the engine 58 in such a manner as to not interfere with the connection between the cylinder head 78 and engine block 80. That is, by mounting first bracket 102 to the cylinder head 78 and mounting the second bracket to the block 80, and then bolting the first mounting bracket 102 to the second mounting bracket 112, the seal between the cylinder head 78 and block 80 is not compromised.

Figure 5:
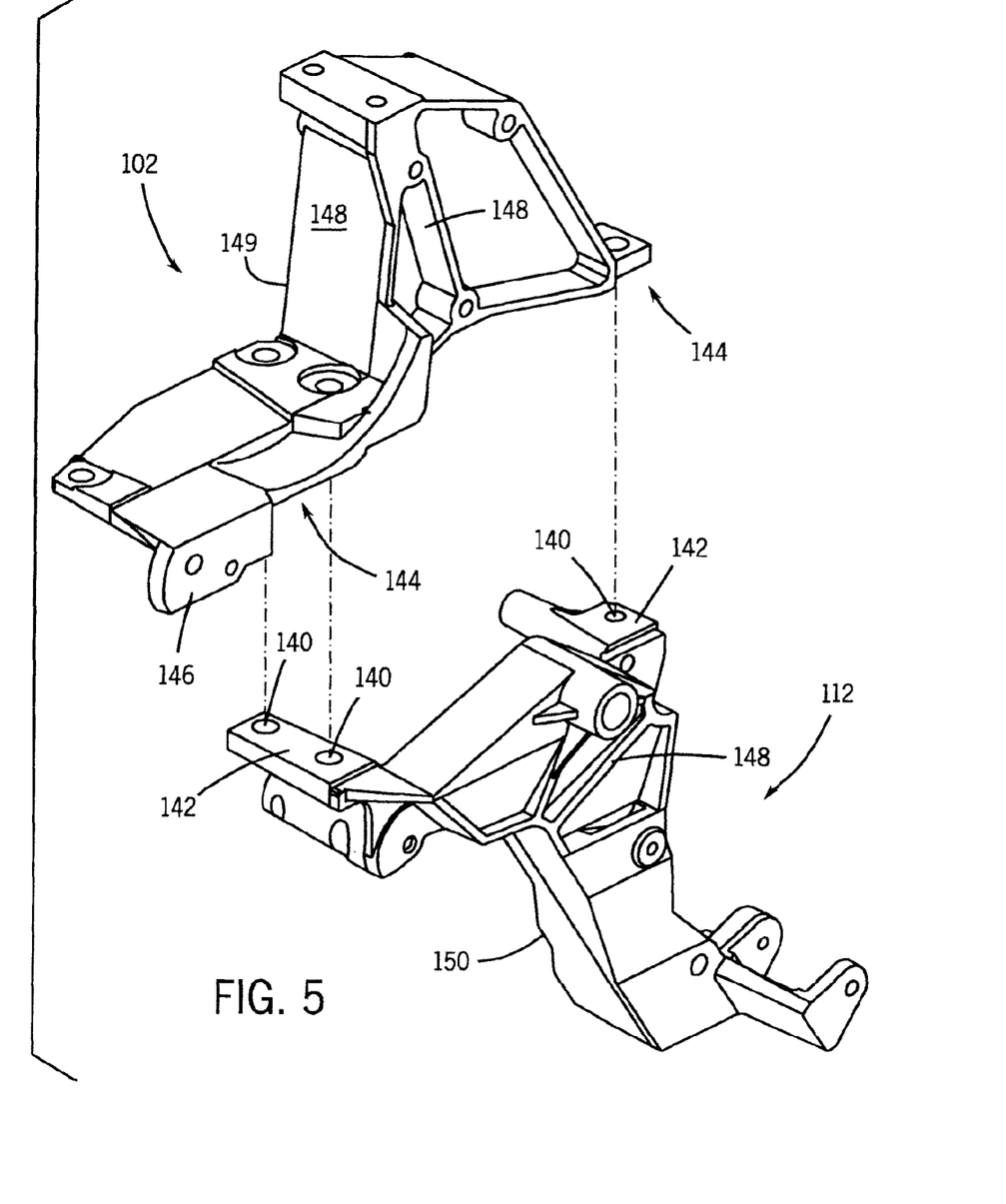
FIG. 5 is a front perspective view of a pair of mounting brackets shown in FIG. 4.
Figure 6:
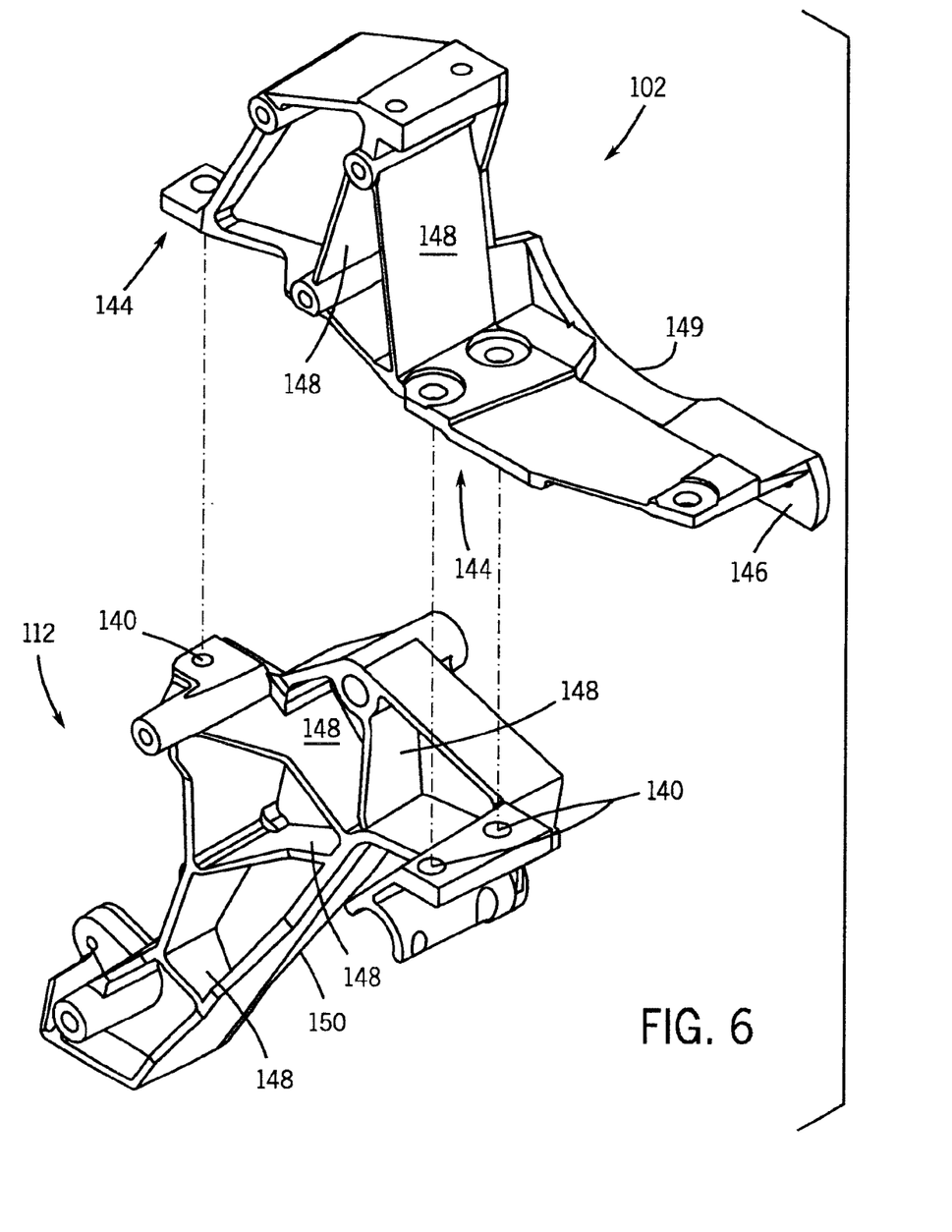
FIG. 6 is a rear perspective view of the pair of mounting brackets of FIG. 5.

FIGS. 5 and 6 show respective front and rear views of the first 102 and second 112 mounting brackets. The first mounting bracket 102 is configured to connect the screw air compressor to the engine such that a longitudinal length of the screw air compressor is aligned with a longitudinal length of the engine. The second mounting bracket 112 includes bolt holes 140 configured to permit connecting of the first mounting bracket 102 to the second mounting bracket 112. The second mounting bracket 112 also has contact surfaces 142 configured to fit smoothly against lower surfaces 144 of the first mounting bracket 102. Surface 146 is used to mount and align belt tensioner 94. The first and second mounting brackets 102, 112 also include bracket stiffeners 148 that add structural strength. Preferably, a backside 149 of the first mounting bracket 102 is contoured to the shape of the cylinder head 78 and a backside 150 of the second mounting bracket 112 is contoured to the shape of the engine block 80 to provide maximum support for the screw air compressor 68.

Figure 7:
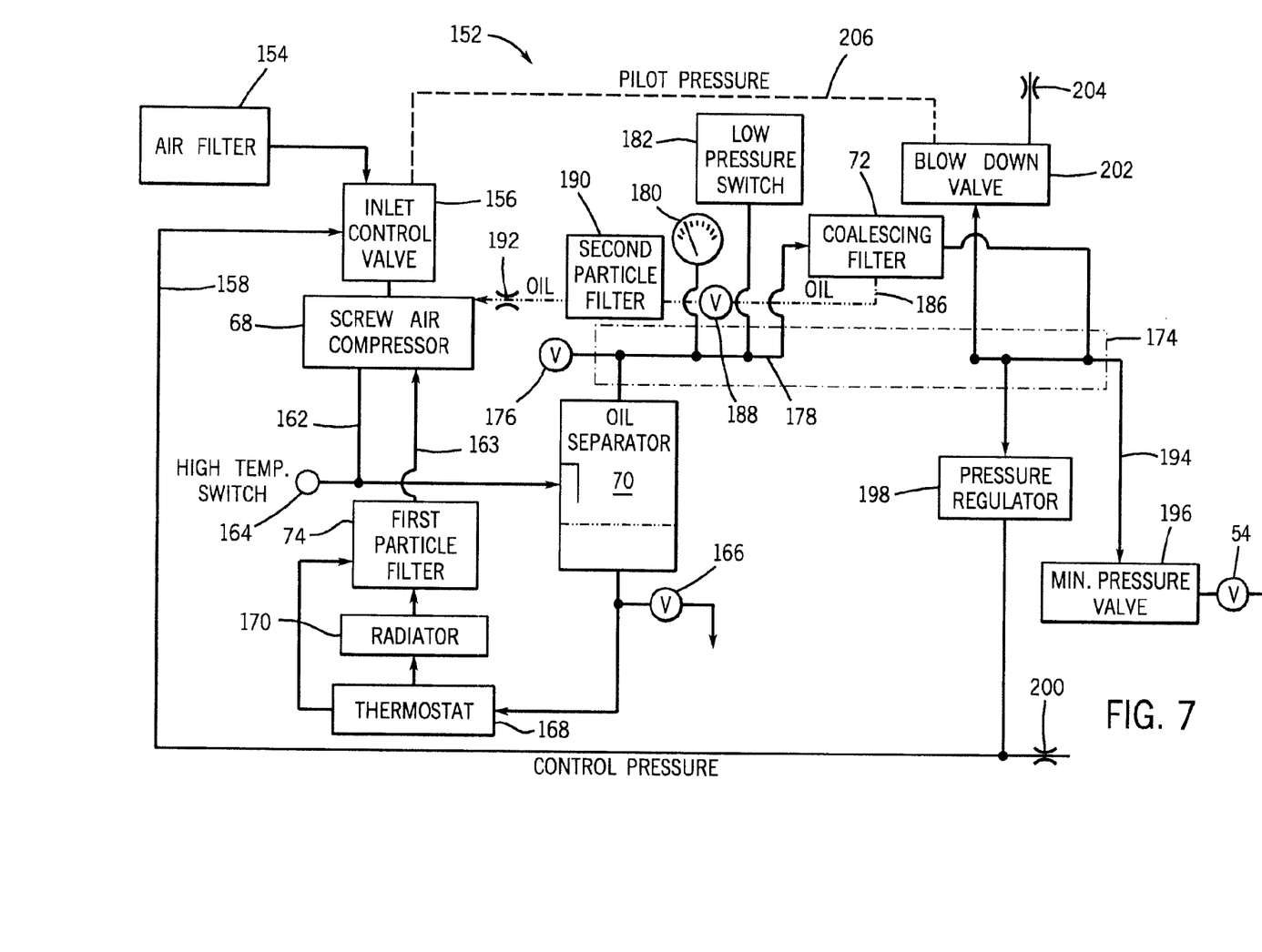
FIG. 7 is a schematic of the screw air compressor air and oil routing system incorporated in the combination of FIG. 1.

Referring now to FIG. 7, a schematic of the compressor air and oil routing system 152 is provided. The compressor system 152 includes an air filter 154 that directs ambient air to an inlet control valve 156. Air pressure along line 158 controls the inlet control valve 156, which regulates air flow into the screw air compressor 68 of FIG. 2. The screw air compressor 68 provides a compressed air/oil mixture along line 162 to the oil separator 70. A high temperature switch 164 monitors the temperature of the air/oil mixture and is configured to open a contact (not shown) to disable the magnetic clutch assembly 107 of FIG. 3 if the temperature exceeds a predetermined limit. After passing through the oil separator 70, oil exits the oil separator 70 and enter a cooling system that includes a thermostat 168 and a radiator 170. A manually controlled drain valve 166 is supplied to drain oil from the oil separator 70. The radiator 170 acts as a dual purpose radiator having two cooling chambers. One of the two chambers cools compressor oil and the other chamber cools engine coolant by circulating engine oil therethrough. Collectively, the oil separator 70, first particle filter 74, thermostat 168, and radiator 170 form a compressor oil cooler assembly capable of reducing the temperature of the filtered oil that returns to the screw air compressor 68 along line 163.

The thermostat 168 includes a control valve that directs oil to either the radiator 170 or the first particle filter 74. When oil is selected by the control valve to pass through the radiator 170, it also passes through the first particle filter 74 after flowing though the radiator 170. After passing through the first particle filter 74, the oil enters the screw air compressor 68. The air, including a small amount of remaining oil mist, exiting from the oil separator 70 flows through a system that includes a distribution manifold 174 and a safety valve 176 for limiting pressure in line 178. Air pressure gauge 180 is provided to monitor line 178. A low pressure switch 182 is also connected to line 178 to prevent restart of the compressor 68 until pressure in the manifold 174 has reached a minimum value.

After entering the manifold 174, the air/oil mixture from line 178 flows through a coalescing filter 72. Oil is routed along line 186 through a one-way valve 188 and a second particle filter 190. After passing through the second particle filter 190, the oil passes through an orifice 192 which regulates flow to the screw air compressor 68. Air exiting from the coalescing filter 72 is delivered to a minimum pressure valve 196 by line 194. If the pressure along line 194 is sufficient, air will pass through the minimum pressure valve 196 to the shut-off valve 54 of FIG. 1, which provides compressed air for pneumatic operations of the welder combination 10. Using air received from the coalescing filter 72, a pressure regulator 198 regulates air pressure along control pressure line 158 in conjunction with a bleed orifice 200. Pressure in line 158 controls the position of inlet control valve 156. Air can also pass from the coalescing filter 72 into a blow-down valve 202 and exit the compressor system 152 through bleed down orifice 204. Depending on the pilot pressure at 206, air flow either increases or decreases through the bleed orifice 204 depending on the position of the inlet control valve 156.

In accordance with one aspect of the present invention, a welder and compressor combination includes a transportable housing and an engine mounted within the transportable housing. The welder and compressor combination also includes an electrical generator configured to generate an arc-welding current. The electrical generator is mounted within the transportable housing and driven by the engine. The welder and compressor combination further includes a screw air-compressor having a clutch assembly driven by a belt in operable association with the engine.

In accordance with another aspect of the present invention, an engine-driven welder combination includes a welder housing having internal components mounted thereto, such as an engine. The portable engine-driven welder combination further includes an electrical generator connected to and rotated by the engine to generate an arc-welding current. In addition to the electrical generator, a screw air compressor is mounted to the engine. The screw air compressor has a disengageable drive pulley connected to the engine and is mounted on the engine.

In yet another aspect of the present invention, a welding and air compression system includes a means for compressing air to generate compressed air and a means for generating an arc-welding current. The means for compressing air has at least one screw-type means in a longitudinal cylinder. The welding and air compression system also includes a means for driving the means for compressing air and the means for generating an arc-welding current, and a means for connecting the means for compressing air to the means for driving. The welding and air compression system further includes a means for regulating the means for compressing air.

In another alternative embodiment, the screw air compressor could equivalently be driven from the generator end of the portable engine driven welding and generator combination. That is, the drive shaft from the engine can extend through the generator to allow a belt pulley to be attached thereto and drive a screw air compressor mounted to the generator.

The present invention has been described in terms of the preferred embodiment, and it is recognized that equivalents, alternatives, and modifications, aside from those expressly stated, are possible and within the scope of the appending claims.

What is claimed is:

1. A welder and compressor combination comprising:
   a transportable housing;
   an engine mounted in at least a portion of the transportable housing;
   an electrical generator configured to generate an arc welding current, the electrical generator mounted within the transportable housing to be driven by the engine; and
   a screw air compressor driven by the engine.

2. The combination of claim 1 further comprising a clutch disposed between the screw air compressor and the engine.

3. The combination of claim 1 further comprising a belt in operable association and driven by the engine to drive the screw air compressor and an oil separator tank connected to the screw air compressor to separate oil from compressed air.

4. The combination of claim 1 further comprising an air filter configured to filter air to the screw air compressor and to supply air to a system output.

5. The combination of claim 1 further including a compressor oil cooler assembly connected to the screw air compressor and capable of reducing a temperature of compressor oil.

6. The combination of claim 5 wherein the compressor oil cooler assembly includes a dual purpose radiator having two cooling chambers, where one chamber cools compressor oil and a second chamber cools engine coolant.

7. The combination of claim 1 further including an inlet control valve pressure regulated and connected to control the flow of air in the screw air compressor.

8. The combination of claim 1 further comprising a first mounting bracket connecting the screw air compressor to the engine such that a longitudinal length of the screw air compressor is aligned with a longitudinal length of the engine.

9. An engine driven welder combination comprising:
   a welder housing having internal components mounted therebehind;
   an engine mounted within the welder housing;
   an electrical generator connected to the engine to generate an arc welding current; and
   a non-reciprocating air compressor connected to the engine driven welder to be driven by the engine.

10. The engine driven welder combination of claim 9 further comprising a pulley arrangement mounted to the engine and a belt drivingly connecting the non-reciprocating air compressor to the engine via the pulley arrangement.

11. The engine driven welder combination of claim 9 further comprising a first mounting bracket and a second mounting bracket, wherein each of the first and second mounting brackets are connected to only one of an engine block and an engine head.

12. The engine driven welder combination of claim 11 wherein the first and second mourning brackets are connected to one another and the first mounting bracket supports the non-reciprocating air compressor.

13. A welding and air compression system comprising:
   means for compressing air having at least one rotating means in a longitudinal cylinder to generate compressed air;
   means for generating an arc welding current;
   means for driving both the means for compressing air and the means for generating an arc welding current; and
   means for connecting the air compressing means to the means for driving.

14. The welding and air compression system of claim 13 further comprising a means for separating an air and a fluid generated by the air compressing means.

15. The welding and air compression system of claim 13 further comprising a means for cooling compressor oil.

16. The welding and air compression system of claim 13 wherein the means for compressing air is a screw air compressor.

17. The welding and air compression system of claim 13 wherein the means for generating an arc welding current includes an engine driven generator.

18. The welding and air compression system of claim 13 wherein the means for driving includes an engine capable of receiving an externally mounted air compressor.

19. The welding and air compression system of claim 13 further comprising a means for controlling the means for compressing air.

20. The welding and air compression system of claim 19 wherein the means for controlling the means for compressing air is a magnetic clutch assembly.

21. The combination of claim 1 wherein the transportable housing includes a panel positioned proximate the screw air compressor.

22. The combination of claim 21 further comprising a first filter and a second filter located behind the panel and fluidly connected to the screw air compressor.

23. The combination of claim 22 wherein the first and second filters are on a common side of the welder and compressor combination.

24. The combination of claim 23 wherein the screw air compressor and the panel are on the common side of the welder and compressor combination.

25. The combination of claim 22 further comprising a third filter fluidly connected to the screw air compressor wherein at least one of the first, second, and third filters is a coalescing filter and two of the first, second, and third filters are particle filters.

26. The combination of claim 3 further comprising a thermostat in thermal communication with a flow through the oil separator tank and constructed to control operation of the screw air compressor.

27. The engine driven welder combination of claim 9 further comprising a first filter and a second filter in fluid communication with the non-reciprocating air compressor.

28. The engine driven welder combination of claim 27 further comprising a third filter in fluid communication with the non-reciprocating air compressor and wherein one filter is a coalescing filter and two filters are particle filters.

29. The engine driven welder combination of claim 27 wherein the first filter, second filter, and non-reciprocating air compressor are positioned on a common side of the engine driven welder combination to allow easy common access thereto.

30. The engine driven welder combination of claim 29 further comprising an access panel positioned on the common side of the engine driven welder combination and constructed to provide access to the first filter, the second filter, and the non-reciprocating air compressor.

31. The engine driven welder combination of claim 9 further comprising an oil separator in fluid communication with the non-reciprocating air compressor and having a thermostat in thermal communication with a fluid passing therethrough, the thermostat constructed to control operation of the non-reciprocating air compressor.

32. The welding and air compression system of claim 19 wherein the means for controlling the means for compressing air includes a thermostat thermally connected to a fluid flow through an oil separator.

33. The welding and air compression system of claim 13 further comprising means for filtering an input flow and means for filtering an output flow of the means for compressing air.

34. The welding and air compression system of claim 33 wherein the input flow filter means, the output flow filter means, and the means for compressing air are on a common side of the welding and air compression system.

35. The welding and air compression system of claim 34 further comprising means for accessing the input flow filter, the output flow filter, and the means for compressing air through a housing.

* * * * *

UNITED STATES PATENT AND TRADEMARK OFFICE
CERTIFICATE OF CORRECTION

PATENT NO. : 6,933,465 B2
DATED : August 23, 2005
INVENTOR(S) : Bankstahl et al.

It is certified that error appears in the above-identified patent and that said Letters Patent is hereby corrected as shown below:

Column 4,
Line 24, delete "bolt" and substitute -- belt --.
Line 25, delete "120" and substitute -- 102 --.

Column 7,
Line 67, delete "mourning" and substitute -- mounting --.

Signed and Sealed this

Tenth Day of January, 2006

JON W. DUDAS
*Director of the United States Patent and Trademark Office*